United States Patent
Heijenk

(10) Patent No.: US 7,126,927 B2
(45) Date of Patent: Oct. 24, 2006

(54) SYSTEM AND METHOD FOR FAIR, CHANNEL-DEPENDENT SCHEDULING FOR WIRELESS SYSTEMS

(75) Inventor: Geert Heijenk, Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1000 days.

(21) Appl. No.: 10/094,311

(22) Filed: Mar. 7, 2002

(65) Prior Publication Data

US 2003/0099249 A1    May 29, 2003

Related U.S. Application Data

(60) Provisional application No. 60/333,458, filed on Nov. 27, 2001.

(51) Int. Cl.
*H04Q 7/00* (2006.01)
(52) U.S. Cl. .................................. 370/329; 370/437
(58) Field of Classification Search .................... None
See application file for complete search history.

(56) References Cited

U.S. PATENT DOCUMENTS

| | | | | |
|---|---|---|---|---|
| 6,807,426 B1* | 10/2004 | Pankaj | ...................... | 370/328 |
| 6,879,561 B1* | 4/2005 | Zhang et al. | ............... | 370/235 |
| 6,901,046 B1* | 5/2005 | Hsu et al. | .................... | 370/332 |
| 2002/0022487 A1 | 2/2002 | Ahn | ........................... | 455/453 |
| 2002/0044527 A1 | 4/2002 | Jiang et al. | .................. | 370/229 |
| 2002/0080719 A1 | 6/2002 | Parkvall et al. | .............. | 370/235 |
| 2002/0123351 A1* | 9/2002 | Miyoshi et al. | ............. | 455/452 |
| 2002/0183066 A1 | 12/2002 | Pankaj et al. | ................ | 455/453 |
| 2003/0096597 A1* | 5/2003 | Kar-Kin Au et al. | ........ | 455/412 |
| 2004/0142714 A1* | 7/2004 | Viswanath et al. | ......... | 455/517 |
| 2004/0176043 A1* | 9/2004 | Huh et al. | ................ | 455/67.13 |

FOREIGN PATENT DOCUMENTS

| | | |
|---|---|---|
| WO | WO 01/61878 | 8/2001 |
| WO | WO 01/71521 | 9/2001 |
| WO | WO 01/76306 | 10/2001 |
| WO | WO 01/80445 | 10/2001 |
| WO | WO 01/89162 | 11/2001 |

OTHER PUBLICATIONS

Standard Search Report for RS 108396US completed Dec. 18, 2002, Dec. 30, 2002, PCT.
X. Liu, E. K. P. Chong and N. Shroff, "Opportunistic Transmission Scheduling with Resource-Sharing Constraints in Wireless Networks," *IEEE Journal on Selected Areas in Communications*, vol. 19, No. 10, pp. 2053-2064, Oct. 2001.
K. Lee and M. El Zarki, "Comparison of Different Scheduling Algorithms for Packetized Real-Time Traffic Flows," Proceedings of 4th International Symposium on Wireless Personal Multimedia Communications (WPMC '01), Aalborg, Denmark, Sep. 9-12, 2001.

* cited by examiner

*Primary Examiner*—Chi Pham
*Assistant Examiner*—Anh-Vu Ly
(74) *Attorney, Agent, or Firm*—Roger S. Burleigh

(57) ABSTRACT

System and method for channel-dependent scheduling wherein data is stored indicating previous channel conditions between a transmitting node and at least one destination node. Additionally, data packets to be transmitted to at least one destination node are queued for later transmission. A determination of the present channel conditions between the transmitting node and the at least one destination node is made and transmissions of the queued packets are scheduled from the transmitting node to the at least one destination node responsive to the present channel conditions and the previous channel conditions.

15 Claims, 3 Drawing Sheets

SYSTEM AND METHOD FOR FAIR, CHANNEL-DEPENDENT SCHEDULING FOR WIRELESS SYSTEMS

RELATED APPLICATION(S)

This application claims priority from and incorporates herein by reference the entire disclosure of U.S. Provisional Application Ser. No. 60/333,458 filed Nov. 27, 2001.

TECHNICAL FIELD

The present invention relates to the transmission of data packets, and more particularly, to the fair, channel-dependent scheduling of transmission of data packets in a wireless system.

BACKGROUND OF THE INVENTION

In wireless systems, a single node, such as a base station, has data packets to be transmitted to a number of destination nodes. Packet transmissions to the destination nodes may be separated in time, space, frequency and/or code. A limited number of packets may normally be transmitted at a specific time, and are multiplexed in space, frequency and/or code. The determination of which packets to transmit at the specific time, in which direction, at which frequency and using which code is determined by a scheduler within the node.

In one example, packets are available for transmission to m different nodes out of a total of n (n>2) active nodes ($o \leq m \leq n$) from the transmitting node at a certain time t, whereas the transmitting node can only transmit a single packet. For the transmitting node, not all of the m receiving nodes are equally suitable to transmit to since the channel conditions may be different for different frequencies, directions and codes. Moreover, the channel conditions from the transmitting node to a receiving node i ($1 \leq i \leq n$) may change over time. The goal of the scheduler is to transmit all packets at the proper time.

A number of basic scheduling mechanisms exist. Examples of these include round-robin, and a range of channel-independent fair queuing schedulers. Some scheduling mechanisms taking channel conditions into account have been proposed such as those described in Kenneth S. Lee, Magda El Zarki, "Comparison of Different Scheduling Algorithms for Packetized Real-Time Traffic Flows", Proceedings of 4th International Symposium on Wireless Personal Multimedia Communications (WPMC'01), Aalborg, Denmark, Sep. 9–12, 2001; and Xin Liu, Edwin K. P. Chong, Ness B. Shroff, "Opportunistic Transmission Scheduling With Resource-Sharing Constraints in Wireless Networks", IEEE Journal on Selected Areas in Communications, Vol. 19, No. 10, October 2001. These mechanisms defer packets to nodes with unfavorable channel conditions for a period of time and transmit packets to other nodes instead.

The problem with round robin based and fair queuing based scheduling mechanisms comes from their inability to take advantage of changing channel conditions. Thus, these mechanisms may try to send data to nodes during a time of difficult channel conditions, resulting in transmission errors, increased power due to power control (and hence increased interference) in CDMA systems, or decreased data rate. Existing channel-dependent scheduling mechanisms tend to be unfair, because receiving nodes, positioned close to the sending nodes tend to get better treatment (more throughput) than receiving nodes positioned further away from the transmitting node. Existing solutions to this problem need either information about deadlines for data packets or assumptions on traffic load in order to provide fairness based on past traffic. Thus, there is a need for improved mechanism within channel-dependent scheduling that will provide a more fair result.

SUMMARY OF THE INVENTION

The present invention overcomes the foregoing and other problems with a system and method for channel-dependent scheduling wherein data indicating previous channel conditions between a transmitting node and at least two destination nodes are stored. Additionally, data packets to be transmitted to the at least one destination nodes are queued. A determination of the present channel conditions between the transmitting node and the at least one destination node is made and along with the previous channel conditions indicated by the stored data enables the scheduling of transmissions to the at least one destination node.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
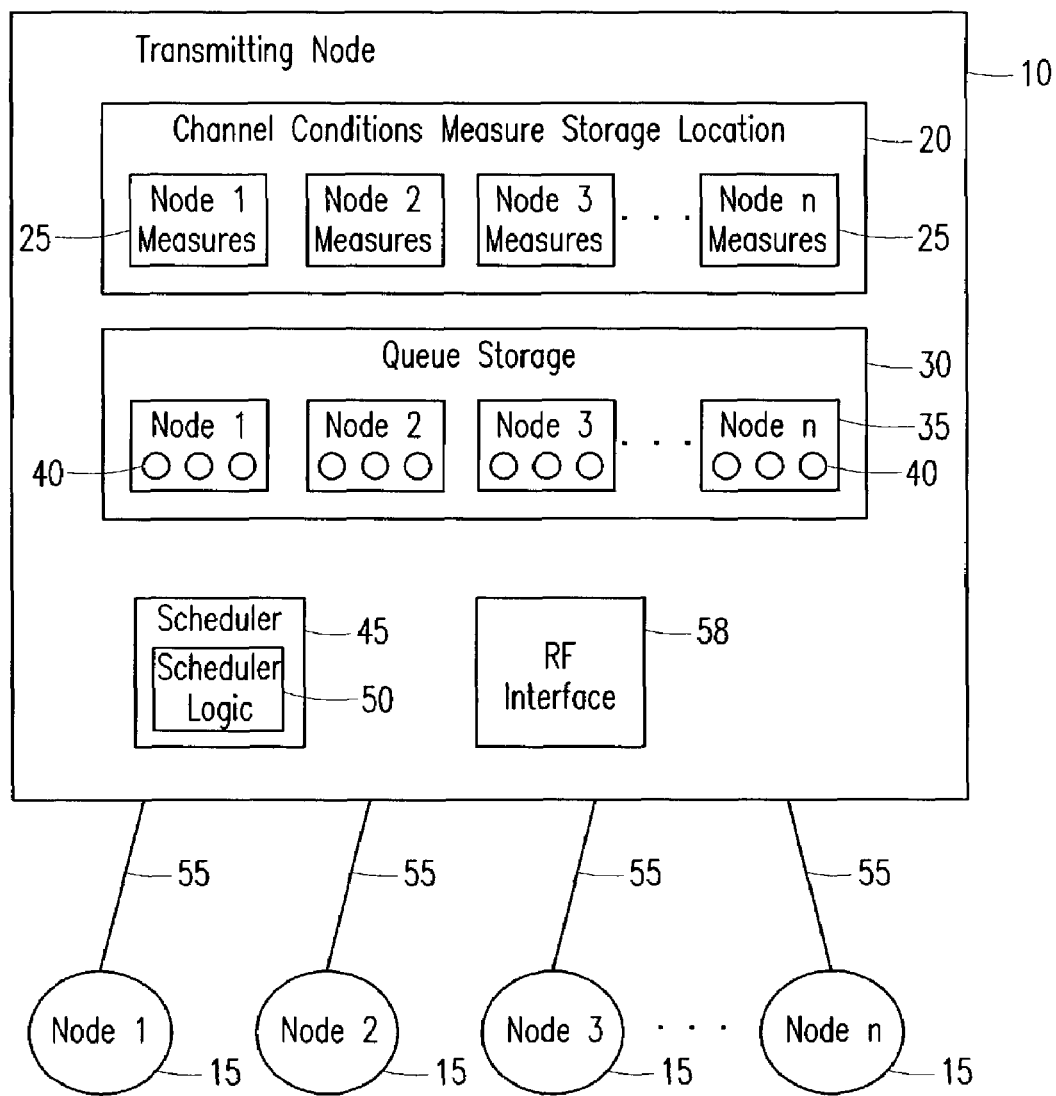
FIG. 1 is a functional block diagram of a transmitting node capable of fair, channel-dependent scheduling to a plurality of destination nodes according to the present invention.

Referring now to the drawings, and more particularly to FIG. 1, there is illustrated a functional block diagram of a transmitting node 10 communicating with a plurality of destination nodes 15 according to the present invention. For each potential destination i ($1 \leq i \leq n$), the transmitting node 10 maintains a storage location 20 for one or more channel condition measures 25 representing the channel conditions in the recent past for each channel between the transmitting node 10 and a destination node. Channel conditions measures 25 are associated with each specific destination node 15 within the channel conditions measure storage location 20. The transmitting node 10 also includes queue storage location 30. The channel conditions may be determined by required transmission power, bit-error rate, detected interference, etc. The queue storage location 30 includes a plurality of queues 35 for each destination node 15. The queue 35 stores data packets 40 that are to be transmitted to an associated destination node 15. The queues 35 comprise logical queues and may be implemented within the storage location 30 in any number of fashions, for example, a shared memory between each of the queues 35, a RAM, etc.

A scheduler 45 including scheduler logic 50 enables the selection of a queued packet 40 to be transmitted to a destination node 15 over a channel 55 interconnecting the transmitting node 10 and a destination node 15. Connection between the transmitting node 10 and the destination node 15 is enabled via an RF interface 58. The RF interface 58 provides for a wireless connection via GSM, CDMA, PCS, AMPS, D-AMPS, etc. The selection of a channel is based upon present channel conditions versus channel conditions in the recent past, as indicated by the channel condition measures 35, for each destination node 15 for which packets are stored in the associated queue 35. The notion of how recent the recent past should be depends upon the delay requirements for the data packets 40 to be transferred. This is a system parameter that may be tuned by the system operator. At transmission time, the scheduler logic 50 enables a determination for each queue 55 containing queued packets for a destination node 15 of the present channel conditions between the transmitting node 10 and the destination node 15. The scheduler 45 schedules a packet for transmission to that node that has the most favorable present channel conditions compared to the channel conditions in the recent past as indicated by the channel control measures 25.

Figure 2A:
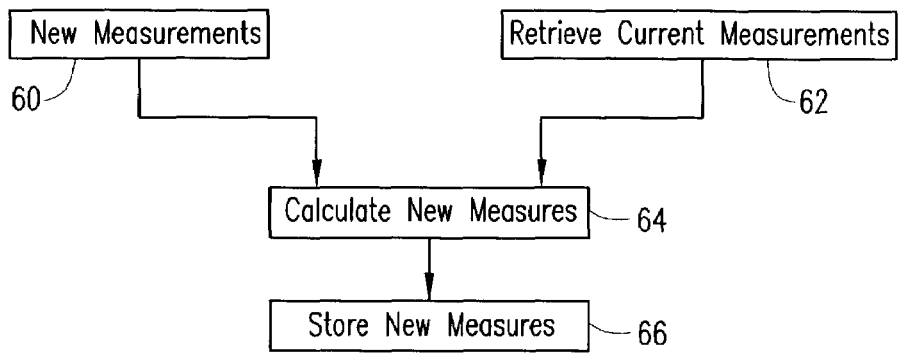
FIGS. 2A and 2B are flow diagrams illustrating the manner in which packets may be scheduled for transmission.
Figure 2B:
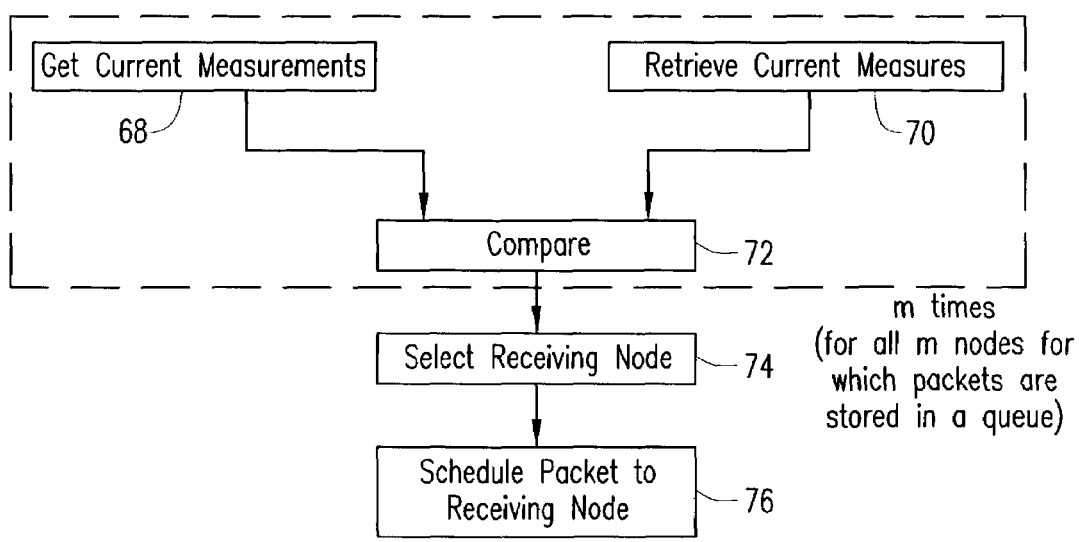

Referring now to FIGS. 2A and 2B, there are flow diagrams illustrating the operation of the scheduler 45 as controlled by the scheduler logic 50. In FIG. 2A, new measurements for channel condition measures are made at step 60. Additionally, the currently stored channel condition measures 35 are retrieved at step 62. The new measurements for the channel conditions along with the retrieved current channel condition measures are used to calculate new channel condition measures at step 64. The newly calculated channel condition measures are stored at step 66. This process is repeated n times for each receiving node.

Referring now to FIG. 2B, the current channel condition measurements are made at step 68. Concurrently, the presently stored channel condition measures stored at step 66 are retrieved at step 70. The current channel condition measurements along and the retrieved channel condition measures are compared at step 72. Steps 68–72 are repeated m times for each m nodes for which packets are stored within a queue. A receiving node having most favorable channel conditions based upon the comparison is selected at step 74. The selection of a receiving node at step 74 is based upon the node having the most favorable channel conditions as compared to the channel conditions in the most recent past. A queued packet is scheduled for transmission to the selected receiving node at step 76.

Figure 3A:
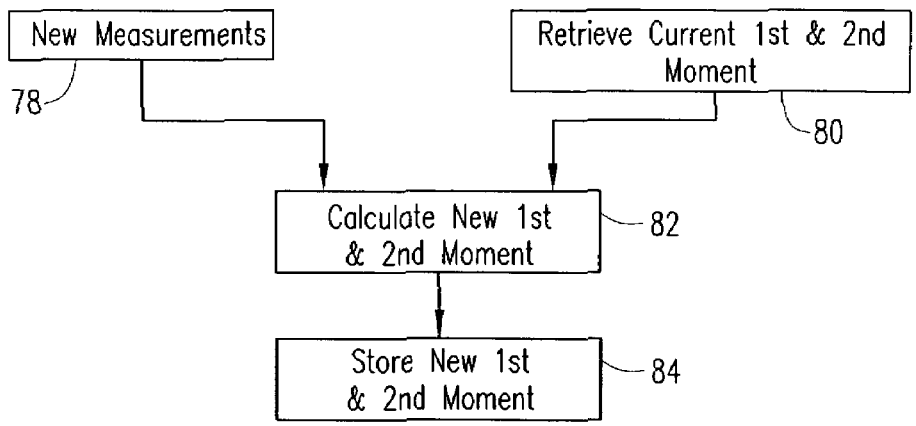
FIGS. 3A and 3B are flow diagrams illustrating the manner of fair, channel-dependent scheduling between a CDMA base station and mobile station.
Figure 3B:
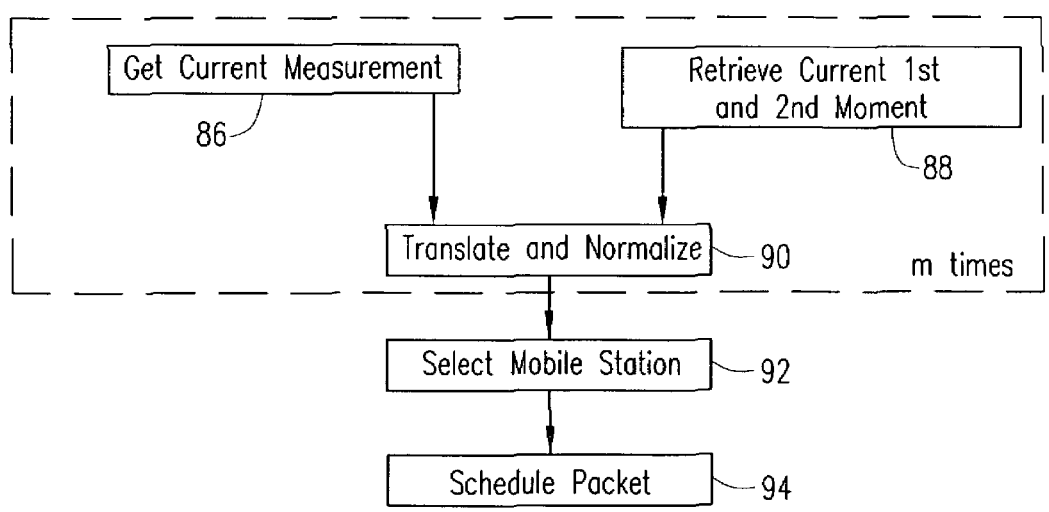

Referring now to FIGS. 3A and 3B, there are illustrated flow diagrams describing the operation of the system of FIGS. 1 and 2 in a downlink of a time slotted CDMA channel such as the HSDPA (High Speed Downlink Packet Access), 3*GPP TR 25.855 V5.0.0 High Speed Downlink Packet Access; Overall UTRAN description (Release 5)*, September 2001 currently defined for UMTS (Universal Mobile Telecommunication System) 3*GPP TR 23.101 V4.0.0 General UMTS Architecture (Release 4)*, April 2001. In this case the transmitting node 10 is a CDMA base station. The receiving nodes 15 are CDMA mobile stations. The channel conditions from the CDMA base station to a specific mobile station are derived from the current required transmission power to that mobile station. At step 78 (FIG. 3A), a new measurement is made of the amount of transmission power required. Concurrently, the most recently stored values for the 1st and 2nd moment of the required transmission power are retrieved at step 80. The 1st moment represents the average transmission power and is calculated using an exponentially weighted moving average algorithm. A similar algorithm is used to calculate the 2nd moment which represents variants of transmission power. The newly measured required transmission power and the retrieved 1st and 2nd moment are used to calculate at step 82 a new first and second moment using an exponentially weighted moving average. The newly calculated 1st and 2nd moments are stored at step 84. This process of steps 78 through 84 are repeated n times for each destination node within the system.

Referring now also to FIG. 3B, the current measurement for the required transmission power are made at step 86 while the currently stored 1st and 2nd moments from step 84 for a node are retrieved at step 88. Translated and normalized transmission power to a node is determined at step 90 by translating and normalizing of the measured transmission power for the node using the stored 1st and 2nd moments Translation (shifting) with the 1st moment (average transmission power) is needed to avoid unfairness between nodes with different absolute signal reception strength due to different distances. Normalization with the 2nd moment (variants of transmission power) is needed to avoid unfairness between nodes with different signal reception strength variations e.g., due to different speeds. A whole range of different, simple, approximating implementations for normalization may be utilized. One is based on the exponentially weighted moving average, as mentioned before. Another one maintains a minimum and maximum transmission power in the past time window and normalizes the current transmission power according to Pnorm=(Pcurrent−Pmin)/(Pmax−Pmin) to get a value between 0 and 1. Steps 86–90 are repeated n times for each destination node within the system.

The mobile station requiring the lowest translated and normalized transmission power is selected at step 92. A packet is scheduled for transmission to the selected mobile station at step 94. This process reduces the total transmission power of the base station compared with other types of scheduling and lowers the interference level within a cell. At the same time, destination nodes 15 far away from the base station are treated as well as nodes close to the base station due to the required transmission power being compared to the average transmission power.

The present invention takes advantage of advantageous channel conditions while overcoming the unfairness of channel-dependent scheduling. Thus, the total capacity of the wireless system may be increased while maintaining long term fairness.

The previous description is of a preferred embodiment for implementing the invention, and the scope of the invention should not necessarily be limited by this description. The scope of the present invention is instead defined by the following claims.

What is claimed is:

1. A method for channel dependent scheduling, comprising the steps of:
 storing data indicating previous channel conditions between a transmitting node and at least one possible destination node;
 queuing data packets to be transmitted to the at least one possible destination node;
 determining present channel conditions between the transmitting node and the at least one possible destination node;
 scheduling transmission of a queued packet from the transmitting node to the at least one possible destination node responsive to the present channel conditions and the previous channel conditions;
 translating and normalizing present channel conditions with respect to previous channel conditions between the transmitting node and the at least one possible destination node;

determining channels having a lowest transmission power responsive to the translation and normalization; and scheduling transmission of the queued packets to channels having the lowest transmission power.

2. The method of claim 1, wherein the step of scheduling further comprises the steps of:
comparing the present channel conditions to the previous channel conditions;
determining a channel having most favorable channel conditions responsive to the comparison; and
scheduling transmission of the queued packets on the channels having the most favorable channel conditions.

3. The method of claim 1 wherein the step of storing further comprises the step of storing a 1st and 2nd moment of transmission power on a channel between the transmitting node and the at least one destination node.

4. The method of claim 3, wherein the step of determining further comprises the step of translating and normalizing a present transmission power according to the stored 1st and 2nd moment transmission power between the transmitting node and the at least one possible destination node.

5. The method of claim 1, wherein the transmitting node comprises a CDMA base station, and the at least one possible destination node comprise CDMA mobile stations.

6. A method for channel dependent scheduling, comprising the steps of:
storing an estimated 1st and 2nd moment of transmission power on a channel between a transmitting node and at least one destination node;
queuing data packets to be transmitted to the at least one destination node; and
translating and normalizing current channel conditions with respect to previous channel conditions between the transmitting node and the at least one destination node;
determining channels having a lowest transmission power responsive to the translation and normalization; and
scheduling transmission of the queued packets to channels having the lowest transmission power.

7. The method of claim 6, wherein the transmitting node comprises a CDMA base station, and the at least one destination node comprise CDMA mobile stations.

8. A transmitting node for providing fair, channel-dependent scheduling, comprising,
an interface for connecting with a channel between the transmitting node and at least one destination node;
a queue associated with the at least one destination node for storing data packets to be transmitted to the at least one destination node;
a memory for storing data indicating previous channel conditions between the transmitting node and the at least one destination node; and
a scheduler for scheduling transmission of queued data packets responsive to the stored previous channel conditions, said scheduler further operative to:
translate and normalize current channel conditions with respect to previous channel conditions between the transmitting node and the at least one destination node;
determine channels having a lowest transmission power responsive to the translation and normalization; and,
schedule transmission of the queued packets to channels having the lowest transmission power.

9. The transmitting node of claim 8, wherein the scheduler further:
determines current channel conditions between the transmitting node and the at least one destination node; and
schedules transmission of queued packets from the transmitting node to the at least one destination node responsive to the current channel conditions and the previous channel conditions.

10. The transmitting node of claim 8, wherein the memory stores an estimated 1st and 2nd moment of transmission power on a channel between the transmitting node and the at least one destination node.

11. The transmitting node of claim 8, wherein the scheduler further:
compares the current channel conditions to the previous channel conditions;
determines a channel having most favorable channel conditions responsive to the comparison; and
schedules transmission of the queued packets on the channel having the most favorable channel conditions.

12. The transmitting node claim 8, wherein the transmitting node comprises a CDMA node.

13. The transmitting node of claim 12, wherein the channel comprises a shared downlink channel.

14. The transmitting node of claim 12, wherein the channel comprises a HSDPA channel.

15. A transmitting node for providing fair, channel-dependent scheduling, comprising;
means for connecting with a channel between a transmitting node and at least one destination node;
means associated with the at least one destination node for storing data packets to be transmitted to the at least one destination node;
means for storing data indicating previous channel conditions between the transmitting node and the at least one destination node;
means for scheduling transmission of queued packets responsive to the stored previous channel conditions;
means for translating and normalizing current channel conditions with respect to previous channel conditions between the transmitting node and the at least one destination node;
means for determining channels having a lowest transmission power responsive to the translation and normalization; and,
means for scheduling transmission of the queued packets to channels having the lowest transmission power.

* * * * *

UNITED STATES PATENT AND TRADEMARK OFFICE
CERTIFICATE OF CORRECTION

| | | |
|---|---|---|
| PATENT NO. | : 7,126,927 B2 | Page 1 of 1 |
| APPLICATION NO. | : 10/094311 | |
| DATED | : October 24, 2006 | |
| INVENTOR(S) | : Heijenk | |

It is certified that error appears in the above-identified patent and that said Letters Patent is hereby corrected as shown below:

On the Title Page, in Field (56), under "U. S. PATENT DOCUMENTS", in Column 1, Line 1, delete "6,807,426 B1*" and insert -- 6,807,426 B2* --, therefor.

On the Title Page, in Field (56), under "U. S. PATENT DOCUMENTS", in Column 1, Line 3, delete "6,901,046 B1*" and insert -- 6,901,046 B2* --, therefor.

In Column 1, Line 31, delete "n (n>2)" and insert -- $n(n \geq 2)$ --, therefor.

In Column 5, Line 13, in Claim 3, after "claim 1" insert -- , --.

In Column 5, Line 16, in Claim 3, after "one" insert -- possible --.

In Column 6, Line 36, in Claim 15, after "comprising" insert -- : --.

Signed and Sealed this

Twenty-second Day of July, 2008

JON W. DUDAS
*Director of the United States Patent and Trademark Office*